United States Patent
Liu et al.

(10) Patent No.: US 11,481,876 B2
(45) Date of Patent: Oct. 25, 2022

(54) SYSTEMS AND METHODS FOR BLIND MULTI-SPECTRAL IMAGE FUSION

(71) Applicant: Mitsubishi Electric Research Laboratories, Inc., Cambridge, MA (US)

(72) Inventors: Dehong Liu, Lexington, MA (US); Lantao Yu, Houston, TX (US); Yanting Ma, Allston, MA (US); Hassan Mansour, Boston, MA (US); Petros Boufounos, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 197 days.

(21) Appl. No.: 16/843,266

(22) Filed: Apr. 8, 2020

(65) Prior Publication Data
US 2021/0319534 A1    Oct. 14, 2021

(51) Int. Cl.
*G06T 3/40*    (2006.01)
*G06T 5/00*    (2006.01)
(Continued)

(52) U.S. Cl.
CPC ............ *G06T 3/4076* (2013.01); *G06T 5/003* (2013.01); *G06T 5/20* (2013.01); *G06T 5/50* (2013.01);
(Continued)

(58) Field of Classification Search
None
See application file for complete search history.

(56) References Cited

U.S. PATENT DOCUMENTS 7,477,802 B2 *    1/2009    Milanfar ............... G06T 3/4053
                                                      358/1.2
9,225,889 B1 *   12/2015    Korkin ............... H04N 5/23232
(Continued)

OTHER PUBLICATIONS

C. Chen, Y. Li, W. Liu and J. Huang, "SIRF: Simultaneous Satellite Image Registration and Fusion in a Unified Framework," in IEEE Transactions on Image Processing, vol. 24, No. 11, pp. 4213-4224, Nov. 2015, doi: 10.1109/TIP.2015.2456415. (Year: 2015).*
(Continued)

*Primary Examiner* — Jiangeng Sun
(74) *Attorney, Agent, or Firm* — Gene Vinokur

(57) ABSTRACT

Systems, methods and apparatus for image processing for reconstructing a super resolution image from multispectral (MS) images. Receive image data and initialize a fused image using a panchromatic (PAN) image, and estimate a blur kernel between the PAN image and the MS images as an initialization function. Iteratively, fuse a MS image with an associated PAN image of a scene using a fusing algorithm. Each iteration includes: update the blur kernel based on a Second-Order Total Generalized Variation function to regularize a kernel shape; fuse the PAN image and MS images with the updated blur kernel based on a local Laplacian prior function to regularize the high-resolution information to obtain an estimated fused image; compute a relative error between the estimated fused image of the current iteration and a previous estimated fused image from a previous iteration, to a predetermined threshold, to stop iterations stop, to obtain a PAN-sharpened image.

20 Claims, 9 Drawing Sheets

(51) Int. Cl.
*G06T 5/20* (2006.01)
*G06T 5/50* (2006.01)

(52) U.S. Cl.
CPC .............. *G06T 2207/10036* (2013.01); *G06T 2207/10041* (2013.01); *G06T 2207/20221* (2013.01)

(56) References Cited

U.S. PATENT DOCUMENTS

| 2011/0090378 A1* | 4/2011 | Wang | H04N 9/04555 348/242 |
| 2014/0278129 A1* | 9/2014 | Voth | G16H 50/50 702/19 |
| 2015/0018664 A1* | 1/2015 | Pereira | A61B 5/4064 600/410 |
| 2016/0117800 A1* | 4/2016 | Korkin | H04N 5/2258 348/239 |

OTHER PUBLICATIONS

He Chuan et al. An Adaptive Total Generalized Variation Model with Augmented Lagrangian MEthod for image Denoising. Mathematical Problems in Engineering vol. 2014, Jan. 1, 2014. pp. 1-11.
Loic et al. Fast Approximations of Shift Variant Blur, International Journal of Computer Vision Kluwer Academic Pubs. Norwell, US, vol. 115, No. 3, Apr. 8, 2015. pp. 253-278.
Lantao et al. Blind Multi Spectral Image Pan Sharpening. ICASSP 2020 Ieee international Conf on Acoustics, Speech and Signal Processing, May 4, 2020, pp. 1429-1433.

* cited by examiner

FIG. 4B (Method of Present Disclosure)

FIG. 4C (Ground Truth)

| Approach | BHMIFGLR | HySure | BLT |
|---|---|---|---|
| Exp. 1/Exp. 2 | 31.72/21.38 | 30.71/30.70 | 37.40/37.40 |

(Simulated True High Res MS)

(Fused MS)

(High-Res Pan)

(Low-Res MS Image)
(only RGB channels are shown)

FIG. 6A Prior art 1: BGLRF
FIG. 6B Prior art 2: HySure
FIG. 6C (Method of Present Disclosure)
FIG. 6D Ground-Truth

SYSTEMS AND METHODS FOR BLIND MULTI-SPECTRAL IMAGE FUSION

FIELD

The present disclosure relates generally to multi-spectral imaging, and more particularly to fusing low spatial resolution multi-spectral images with their associated but not well aligned high spatial resolution panchromatic image.

BACKGROUND

Conventional multi-spectral (MS) imaging is widely used in remote sensing and related areas. The bands of interest in MS imaging cover RGB, near infra-red (NIR), and short-wave IR (SWIR), etc. MS imaging provides for discrimination of objects with different material properties which may otherwise be very similar in the RGB bands, and information can be gathered in the presence of harsh atmospheric conditions such as haze and fog, as infra-red waves can travel more easily through these media, as compared to visible light.

Conventional MS sensing presents many interesting challenges. For example, many applications require to have both high spatial and spectral resolutions. However, there is a fundamental trade-off between the bandwidth of the sensor and the spatial resolution of the image. Conventional high spatial resolution is achieved by panchromatic (PAN) image covering the visible RGB bands but without spectral information, while MS images have rich spectral information but with low spatial resolution, which leads to the problem of MS image fusion.

Conventional methods use various techniques to mitigate this hardware limitation and achieve both high spatial and high spectral reoslution images. Further, there are many problems with conventional MS image fusion methods. For example, given a set of low resolution MS images obtained at different wavelengths as well as a high resolution panchromatic image which does not have spectral information, the conventional model-based MS image fusion methods may not perform well in achieving both high spectral and high spatial resolutions, while the recent data-driven methods, especially deep-learning based methods, may achive good performance, but require a lot of training MS and PAN images, and are less intepretable and lack of theoretical convergence guarrenttee.

For example, some conventional methods use original MS and PAN images captured by different sensors, from different view angles, or at different times, resulting in images not well-aligned with each other, along with sharing the same blur kernel. Further, the parametric relationship between MS and PAN images are often unclear since the spectrum of PAN image only covers a fraction of the entire spectra of MS image. Some of the many problems with these conventional methods is the lack of spatial resolution of the MS images. These conventional methods fail to increase the spatial resolution of MS images, some reasons why these conventional methods fail is due to the MS images are degraded due to the misalignment between MS and PAN images.

The present disclosure addresses the technological needs of today's image processing industries and other related technology industries, by solving the conventional problems of MS image fusion, by producing a set of images that have both high spectral and high spatial resolutions.

SUMMARY

The present disclosure relates to fusing low spatial resolution multi-spectral (MS) images with their associated high spatial resolution but not well aligned panchromatic (PAN) image.

Some embodiments of the present disclosure, assume the low resolution MS can be achieved by blurring and down-sampling the fused high-resolution MS image, wherein the blurring operation is realized by an unknown smooth blur kernel, wherein the kernel has a minimum second-order total generalized variation, and the high-resolution information of the fused MS image can be acquired from the PAN image via a local Laplacian piror function. Some embodiements of the present disclosure initialize initialize an estimated fused image using a PAN image to obtain an estimated blur kernel, via an initialization function. Then, iteratively use a fusing algorithm, such that for each iteration includes the steps of, updating the estimated blur kernel using a Second-Order Total Generalized Variation ($TGV^2$) function, a next step of fusing the PAN and MS images with the updated blur kernel based on a local Laplacian prior (LLP) function to obtain an estimated fused image, followed by a step of computing a relative error between the estimated fused image of the current iteration and a previous estimated fused image from a previous iteration, wherein when, the relative error is less than a predetermined threshold, the iterations stops, resulting in obtaining a PAN-sharpened image.

However, in order to construct the embodiments of the present disclosure, experimentation included many experimental approaches including an approach to blind MS image pan-sharpening. For example, blind MS image pan-sharpening is aimed to enhance the spatial resolution of a set of spatially low-resolution MS channels, that cover a wide spectral range, that use their corresponding misaligned spatially high-resolution PAN image. Wherein, the original MS and PAN images were captured using different sensors, from different view angles, or at different times, which resulted in images not well-aligned with each other. Also, the parametric relationship between MS and PAN images was unclear since the spectrum of PAN image only covered a fraction of the entire spectra of MS image. In order to address these problems, some embodiments of the present disclosure realized that some methods need to fuse MS and PAN images without the knowledge of the misalignment, the blur kernel, or any parametric models of cross-channel relationship. Based on this realization, results were found to yield significantly better images with a spatial resolution of the PAN image and a spectral resolution of the MS images, when compared to the above conventional methods that use optimization-based and deep-learning-based algorithms. However, these methods still exhibited limited successes in the MS image pan-sharpening tasks.

So, further experimentation led to some experiments in pan-sharpening using local gradient constraints (LGC) to regularize the cross-channel relationship, however, only when the blur kernel was known, were improvements found. This then followed with exploring with experiments relating to cross-channel priors for blind image pan-sharpening. Other experiments included using a total variation (TV)-based regularizer applied to the blur kernel which appeared to force small gradients to be 0, resulting in non-trivial errors, when the ground-truth blur kernel is smooth. Still some other experiments included using a Second-Order Total Generalized Variation ($TGV^2$) which later provided to have more flexible features than the total variation. However, because of the non-convexity of the problems to be solved according to the present disclosure, some experimental methods resulted in a bad local minima when misaligned displacements were large, thus causing poor fusion performance. Thus, based on the different approaches of experimentation, some novel aspects were realized, and later used in constructing some of the embodiments of the present disclosure.

For example, at least one realization gained from experimentation included using a novel local Laplacian prior (LLP) to regularize a relationship between MS and PAN images, which was found to deliver better performance than using local gradient constraints (LGC). Another realization gain from experimentation is in using a Second-Order Total Generalized Variation (TGV$^2$) to regularize the blur kernel, which resulted in offering more robust and accurate estimation of the blur kernel than existing TV-based priors, as well as resulted in providing more flexible features than the total variation. Still another realization gain from experimentation is in adopting an initialization strategy for the blur kernel which was later discovered to help avoid undesirable local minima in the optimization, among other novel aspects.

Some of the embodiments of the present disclosure address the conventional problems of sharpening MS images with their associated misaligned PAN image, based on using priors on a spatial blur kernel and on a cross-channel relationship. In other words, by formulating the blind pan-sharpening problem within a multi-convex optimization framework using a total generalized variation for the blur kernel and local Laplacian prior for the cross-channel relationship. The problem can be solved by the alternating direction method of multipliers (ADMM), which alternately updates the blur kernel and sharpens intermediate MS images. After experimentation of these methods of the present disclosure, these numerical experiments demonstrated that this approach is more robust to large misalignment errors, and yields significantly better super resolved MS images, when compared to conventional methods that use optimization-based and deep-learning-based algorithms. However, these embodiments were also constructed based on the existing realizations, as well as other realizations gained from more experimentation.

For example, some of these other realizations learned from experimentation includes different approaches using model-based methods and data-driven methods. Because MS image fusion is essentially an under-determined ill-posed problem, some aspects learned is that the model-based methods generally have theoretical convergence guarantees, but had a relatively poor performance when compared to data-driven methods. This was witnessed in some experiments using deep learning-based methods. On the other hand, purely data-driven methods that operated as a black box, were less interpretable. The model-based deep learning approaches, eventually led to experimentation using a combination of model-based and data-driven solution based on deep learning in order to solve the multi-spectral image fusion problem. For example, unrolling iterations of the projected gradient descent (PGD) algorithm, and then replacing the projection step of PGD with a convolutional neural network (CNN) to solve the multi-spectral image fusion problem. However, these experimental approaches were found to have many constraints and problems, not suitable for the proposed embodiments and methods of the present disclosure. For example, some of these many constraints and problems, included:

(1) requiring that the PAN & MS Sensors to be at same angle and elevation, (unacceptable problems) which was later realized that these physical sensor localization limitations were unacceptable and significantly limiting the use and application for the user, among other complications;
(2) requiring prior knowledge of misalignment, knowledge of blur kernel, or parametric models of cross-channel relationship, (unacceptable problems) which upon reflection, were found to be unacceptable and very limiting in terms of computational resources, setup requirements, hardware requirements, among other difficulties;
(3) requiring pre-training of the fusion algorithm, (unacceptable problems) which was learned from experimentation resulted in extensive computation costs, computation time, among other drawbacks;
(4) requiring large amounts of data for the methods to operate, (unacceptable problems) which as learned from experimentation proved to be inconvenient, time consuming, commanded an extensive effort, among other challenges;
(5) requiring an extensive amount of computational time, (unacceptable problems) which experimentation showed that the time complexity of these algorithms quantified large amounts of time taken to run as a function of the length of the input (i.e. computation time or run time to perform a computational process was an excessive amount of time), as well as with having a space complexity that required large amounts of space or memory that was taken by these algorithms to run as a function of the length of the input, in terms of the time limitations imposed on some of the methods of the present disclosure, of which, the above constraints and problems were compared to proposed performance and operation thresholds believed for some of the methods of the present disclosure.

Practical Applications

Some practical applications the embodiments of the present disclosure can include fuse low-resolution remote sensing MS images using high resolution PAN images captured by a different platform or at a different time for land survey, forest coverage analysis, crop growth monitoring, and mineral exploration, etc.

According to an embodiment of the present disclosure, a system for reconstructing a super resolution image from multispectral (MS) images. The system having a transceiver to accept data. A memory to store the data, the data including MS images and a panchromatic (PAN) of a scene, each MS image is associated with the PAN image. A processing device operatively connected to the transceiver and the memory. The system comprising that the processing device is configured to initialize a fused image using the PAN image, and estimate a blur kernel between the PAN image and the MS images as an initialization function. Iteratively, fuse a MS image with an associated PAN image of the scene using a fusing algorithm by a processor. Each iteration includes: update the blur kernel based on a Second-Order Total Generalized Variation (TGV$^2$) function to regularize a kernel shape; fuse the PAN image and MS images with the updated blur kernel based on a local Laplacian prior (LLP) function to regularize the high-resolution similarity between the PAN image and the fused MS image to obtain an estimated fused image; compute a relative error between the estimated fused image of the current iteration and a previous estimated fused image from a previous iteration, wherein, when the relative error is less than a predetermined threshold, the iterations stop, resulting in obtaining a PAN-sharpened image. Output, via an output interface in communication with the processor, the PAN-sharpened image to a communication network or to a display device.

According to another embodiment of the present disclosure, an apparatus having computer storage including a computer-readable storage medium. A hardware processor device operatively coupled to the computer storage and to reconstruct spatial resolution of an image of a scene captured within multi-spectral (MS) images and panchromatic (PAN) images. The MS images obtained from a MS image sensor having a color filter array and positioned at a first optical axis. The PAN images obtained from a PAN image sensor positioned at a second optical axis that is substantially parallel to the first optical axis. Wherein, to reconstruct the spatial resolution of the image, the apparatus comprising that the hardware processor device is to initialize a fused image using a PAN image, and estimate a blur kernel between the PAN image and the MS images using an initialization function. Iteratively, fuse a MS image with an associated PAN image of the scene using a fusing algorithm by a processor. Each iteration includes: (a) update the blur kernel based on a Second-Order Total Generalized Variation (TGV$^2$) function to regularize a kernel shape; (b) fuse the PAN image and MS images with the updated blur kernel based on a local Laplacian prior (LLP) function to regularize the high-resolution similarity between the PAN and the fused MS image to obtain an estimated fused image; and (c) compute a relative error between the estimated fused image of the current iteration and a previous estimated fused image from a previous iteration, wherein, when the relative error is less than a predetermined threshold, the iterations stop, resulting in obtaining a PAN-sharpened image. An output interface in communication with the processor, to output the PAN-sharpened image to a communication network or to a display device.

According to another embodiment of the present disclosure, a system for reconstructing a super resolution image from multispectral (MS) images. The system having an input interface to accept data. The system having a memory to store the data, the data including MS images and panchromatic (PAN) images of a scene, each MS image is associated with a PAN image, and a hardware processing device operatively connected to the input interface and the memory. The system comprising that the hardware processing device is configured to initialize a fused image using a rigid PAN image. Estimate a rigid transformation blur kernel between the PAN image and the MS images as an initial blur kernel function. Iteratively, fuse a MS image with an associated PAN image of the scene using a fusing algorithm by a processor. Each iteration includes: (a) update the blur kernel based on a Second-Order Total Generalized Variation (TGV$^2$) function to regularize a kernel shape; (b) fuse the PAN image and MS images with the updated blur kernel based on a local Laplacian prior (LLP) function to regularize the high-resolution similarity between the PAN image and the fused MS image to obtain an estimated fused image; (c) compute a relative error between the estimated fused image of the current iteration and a previous estimated fused image from a previous iteration, wherein, when the relative error is less than a predetermined threshold, the iterations stop, resulting in obtaining a PAN-sharpened image; and (d) output, via an output interface in communication with the processor, to output the PAN-sharpened image to a communication network or to a display device.

According to another embodiment of the present disclosure, a non-transitory machine-readable medium including instructions stored thereon which, when executed by processing circuitry, configure the processing circuitry to perform operations to sharpen a multi-spectral (MS) image using data from a panchromatic (PAN) image, the operations for receiving data, the data including MS images and a panchromatic (PAN) image of a scene, each MS image is associated with the PAN image. Initializing a fused image using the PAN image, and estimate a blur kernel between the PAN image and the MS images to obtain a blur kernel using an initialization function. Iteratively, fuse a MS image with an associated PAN image of the scene using a fusing algorithm by a processor. Each iteration includes: (a) updating the blur kernel based on a Second-Order Total Generalized Variation (TGV$^2$) function to regularize a kernel shape; (b) fusing the PAN image and MS images with the updated blur kernel based on a local Laplacian prior (LLP) function to regularize the high-resolution similarity between the PAN image and the fused MS image to obtain an estimated fused image; (c) computing a relative error between the estimated fused image of the current iteration and a previous estimated fused image from a previous iteration, wherein, when the relative error is less than a predetermined threshold, the iterations stop, resulting in obtaining a PAN-sharpened image; and (d) outputting the PAN-sharpened image to a communication network or to a display device via an output interface in communication with the processor.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIGS. 4A, 4B and 4C are pictures illustrating a comparison of estimated kernels in experiment II, such that FIG. 4A shows results using a prior art method, FIG. 4B shows results using the method of the present disclosure, and FIG. 4C shows a ground truth image, respectively, according to some embodiments of the present disclosure;

FIG. 4D is a schematic of a table illustrating some experimental results of a quantitative analysis of blind pan-sharpening results, according to some embodiments of the present disclosure;

FIG. 5A is a input low-resolution MS image (only showing the RGB channels), FIG. 5B is a high-resolution PAN image, FIG. 5C is a fused image, and FIG. 5D is a simulated true High Resolution MS image, respectively, according to some embodiments of the present disclosure;

FIGS. 6A, 6B, 6C, 6D are pictures illustrating example of images of pan-sharpening results from experiment I using different methods, FIG. 6A is conventional prior art method using BHMIFGLR, FIG. 6B is conventional prior art method using HySure, FIG. 6C is a method of the present disclosure, and FIG. 6D is showing a Ground truth image, respectively, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1A:
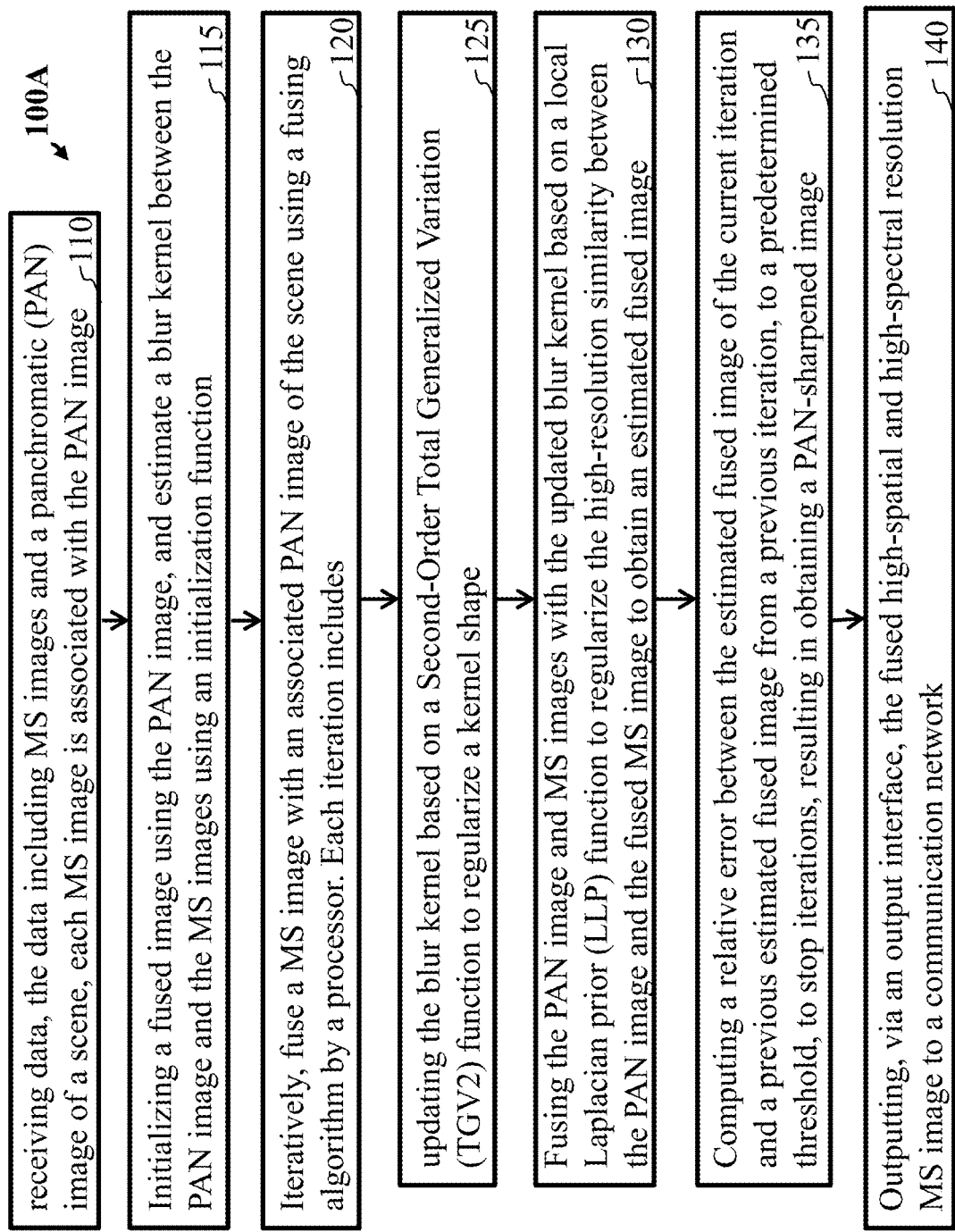
FIG. 1A is a block diagram illustrating a method for image processing for increasing resolution of a multi-spectral image, according to some embodiments of the present disclosure.

FIG. 1A is a block diagram illustrating a method for image processing for increasing resolution of a multi-spectral image, according to some embodiments of the present disclosure.

Step 110 of method 100A can include receiving data, the data including MS images and a panchromatic (PAN) image of a scene, each MS image is associated with the PAN image.

Further, each MS image includes multiple channels, each channel is associated with a frequency band, such that an image of a channel represents the frequency response within the associated frequency band. It is possible the data can be stored in a memory. For example, the data can be stored in one or more databases of a computer readable memory, such that the processor or hardware processor is in communication with the computer readable memory and the input interface or a transceiver.

Step 115 of FIG. 1A can include initializing a fused image using the PAN image, and estimate a blur kernel between the PAN image and the MS images using an initialization function.

Step 120 of FIG. 1A can include iteratively, fuse a MS image with an associated PAN image of the scene using a fusing algorithm by a processor. Each iteration includes:

Step 125 of FIG. 1A can include updating the blur kernel based on a Second-Order Total Generalized Variation ($TGV^2$) function to regularize a kernel shape;

Step 130 of FIG. 1A can include Fusing the PAN image and MS images with the updated blur kernel based on a local Laplacian prior (LLP) function to regularize the high-resolution similarity between the PAN image and the fused MS image to obtain an estimated fused image; and Step 135 of FIG. 1A can include computing a relative error between the estimated fused image of the current iteration and a previous estimated fused image from a previous iteration. Wherein, when the relative error is less than a predetermined threshold, the iterations stop, resulting in obtaining a PAN-sharpened image.

Step 140 of FIG. 1A can include outputting the PAN-sharpened image to a communication network or to a display device via an output interface in communication with the processor.

Some methods of the present disclosure use a blind multi-spectral (MS) Image fusion method using local Laplacian prior (LLP) and second-order total generalized variation ($TGV^2$). The LLP regularizes the relationship between high-frequency components of MS and PAN images, yielding better fusion performance than local gradient constraints. Wherein, the $TGV^2$ regularizes the blur kernel with more robustness to noise and more accurate estimation of the blur kernel than other existing sparsity-driven priors. From experimentation, results exhibited consistent better performance on fusing mis-registered MS and panchromatic images than the conventional state-of-the-art methods in terms of visual quality and multiple quantitative metrics. Further, as exhibited from experimentation, the methods of the present disclosure achieved a fast convergence in a short computational time with a warm start, than the conventional state-of-the-art methods. Wherein the blind fusion algorithm outperformed conventional deep-learning based methods in regions with abundant edges and textures such as Cuprite, Moffett, and Los Angeles images, and is comparable in regions without too much edges such as Cambria Fire image.

Also, some aspects of the embodiments of the present disclosure include novel methods for misaligned MS image pan-sharpening based on the local Laplacian prior (LLP) and the Second-Order Total Generalized Variation (TGV2). Numerical experiments show that some method approaches significantly outperform conventional optimization-based and deep learning-based baseline approaches. Moreover, some embodiments of the present disclosure have a better generalization ability than conventional deep learning-based methods, due in part to not having or without external training data, and thus, provide substantial flexibility and adaptability to deal with multi-spectral imagery from a large variety of imaging platforms.

Figure 1B:
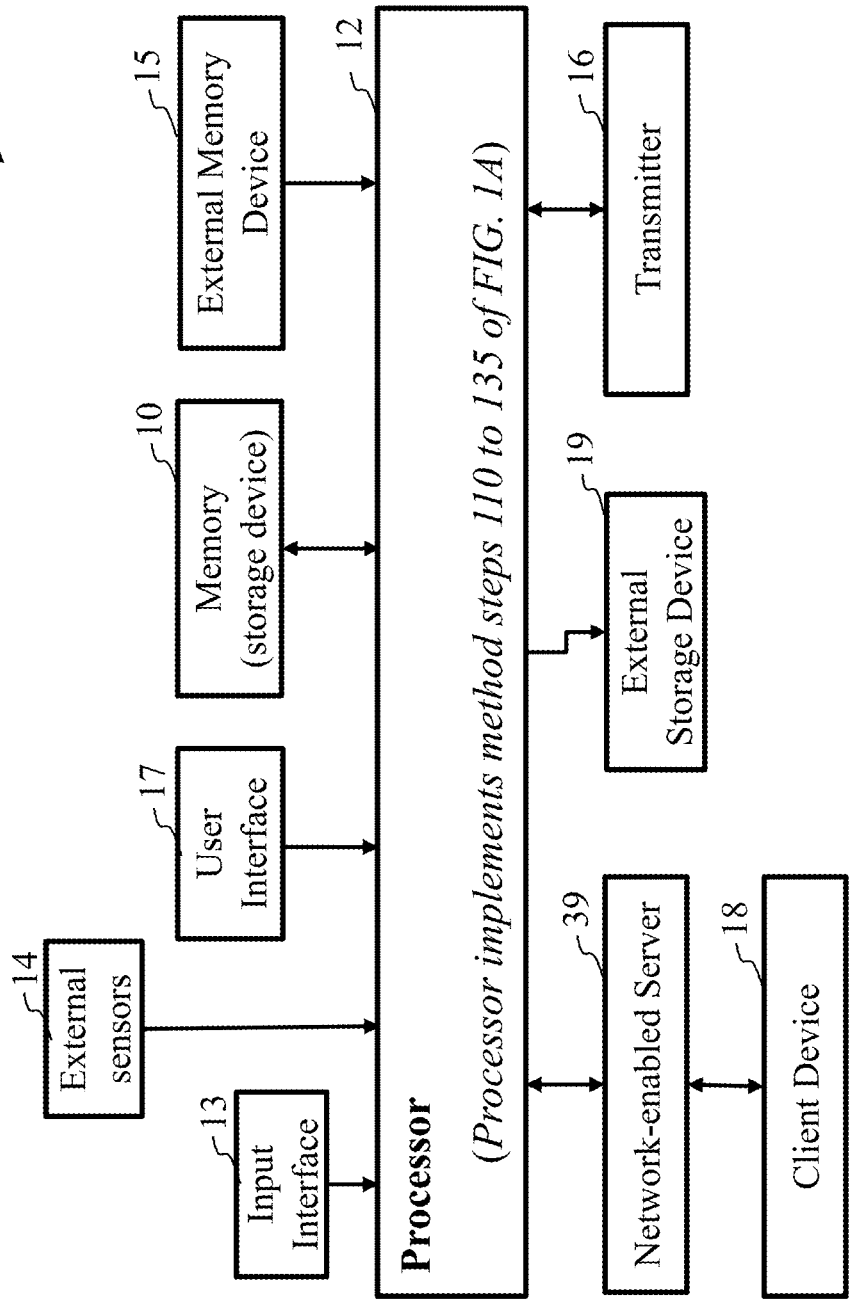
FIG. 1B is a schematic illustrating a method that includes some components that may be used for implementing the method, according to some embodiments of the present disclosure.

FIG. 1B is a schematic illustrating a method that includes some components that may be used for implementing the method 100B, according to some embodiments of the present disclosure. For example, some components can include an input interface 13, a user interface 17, a memory 10 (storage device), an external memory device 15, and a processor 12 (hardware processor) that can implement the steps of the method.

The signal data can include multi-spectral (MS) image data gathered by at least one external sensor 14 and acquired by the input interface 13 or from an external memory device 15, or some other means of communication either wired or wireless. For example, the signal data can be acquired by the processor 12 either directly or indirectly, e.g., a memory transfer device, or a wireless communication like device. It is possible, a user interface 17 having a keyboard (not shown) can be in communication with the processor 12 and a computer readable memory, and can acquire and store the MS and PAN images in the computer readable memory 10 and other data, upon receiving an input from a surface of the keyboard of the user interface 17 by a user.

Still referring to FIG. 1B, the processor 12 can be in communication with a network-enabled server 39, which may be connected to a client device 18. Further, the processor 12 can be connected to a transmitter 16 and an external storage device 19.

Figure 2:
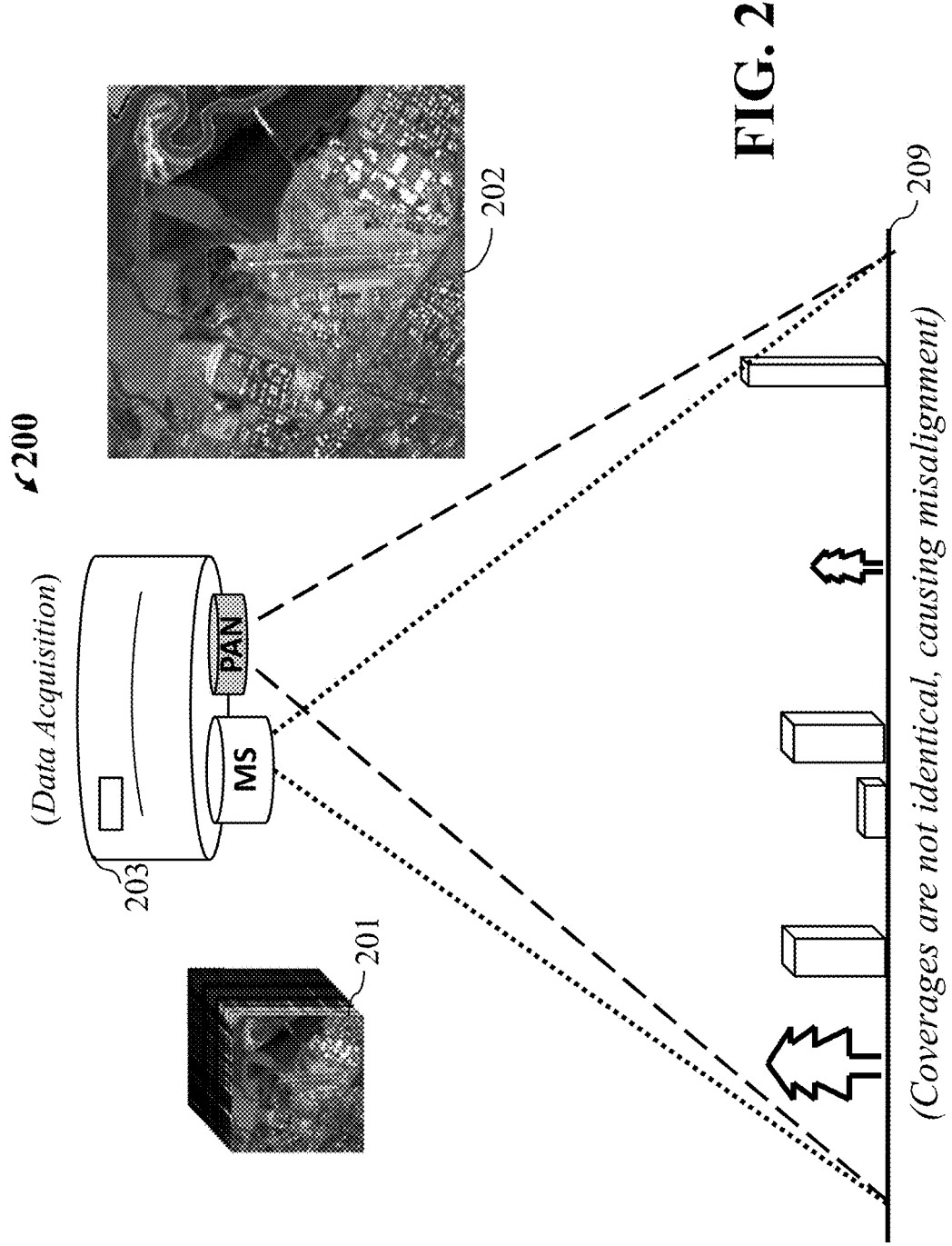
FIG. 2 is a schematic illustrating how the method can collect data for the method, according to some embodiments of the present disclosure.

FIG. 2 is a schematic illustrating how a method 200 can collect data, i.e. multi-spectral (MS) image 201 of a scene 209 and panchromatic (PAN) image 202 of the scene 209, according to some embodiments of the present disclosure. The sensors 203 is capable of multiple sensing features including capturing or collecting data over a wide frequency range beyond the optical bands, including MS images 201 and PAN images 202 of the scene 209. Since infra-red and short-wave infra-red bands can penetrate clouds, the sensors 203 can capture the scene 209 in the infra-red and short-wave infrared bands. Due to the size and weight of MS camera in sensors 203, the resolution of MS image 201 is lower than the PAN image 202.

Figure 3A:
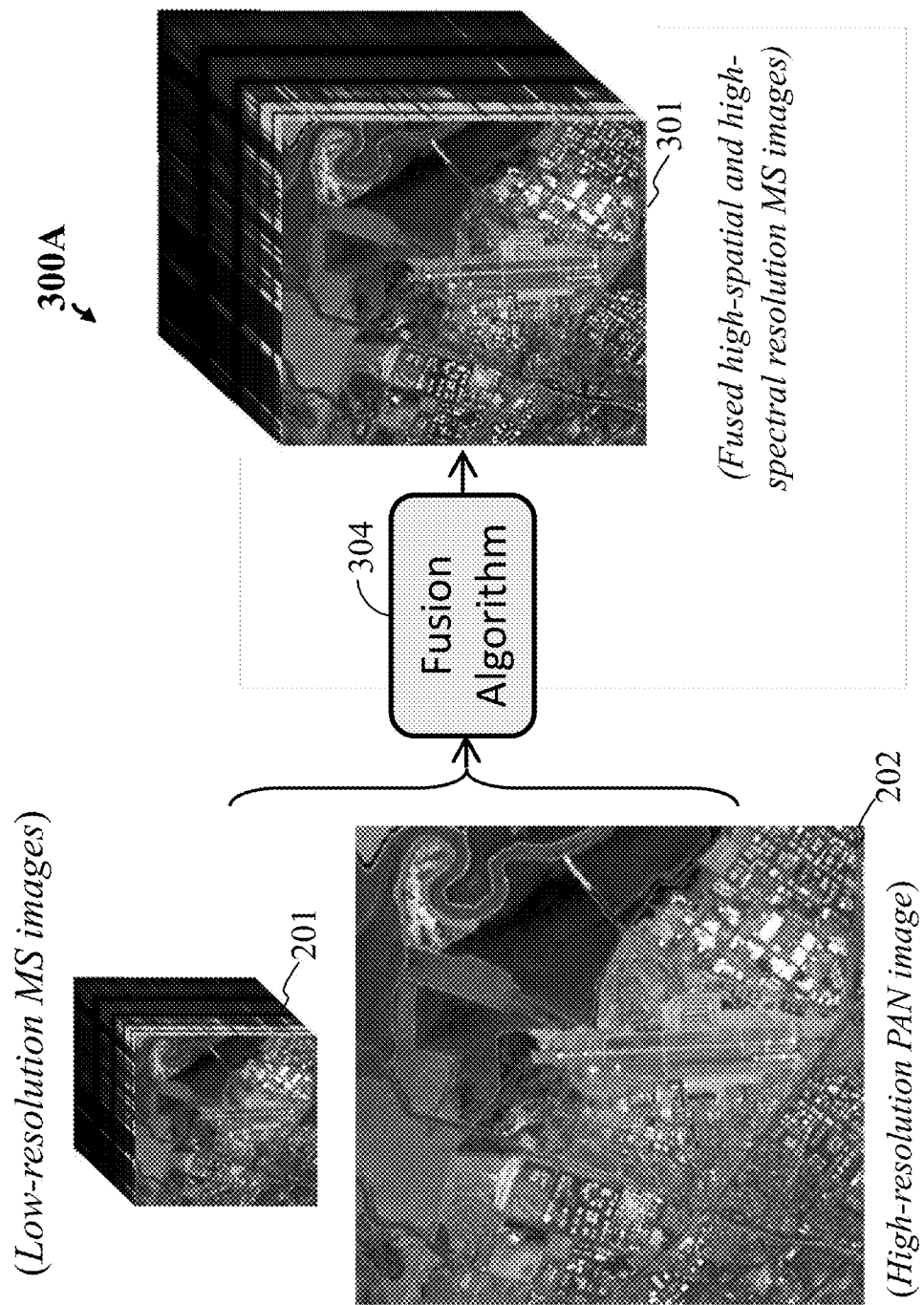
FIG. 3A is a schematic illustrating MS image fusion using a fusion system, according to some embodiments of the present disclosure.

FIG. 3A is a schematic illustrating using the fusing algorithm having a process 300A that includes using low-resolution Multi-spectral (LRMS) images 201A and high-resolution panchromatic (HRPAN) images 202A to reconstruct fused high-spatial and high-spectral resolution MS images 301A, i.e. super-resolved (SR) multi-channel images, using a fusion algorithm 304A, according to some embodiments of the present disclosure.

Figure 3B:
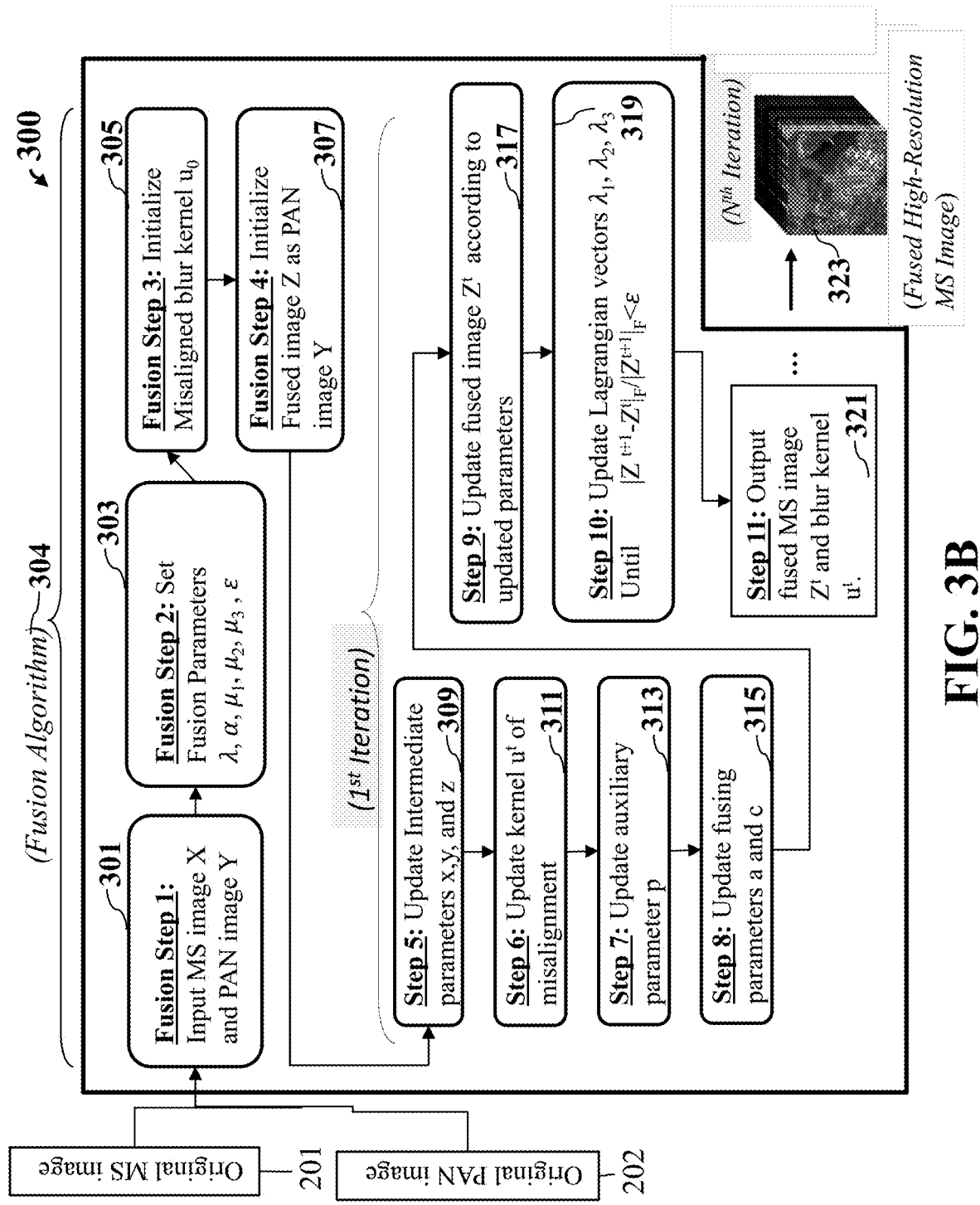
FIG. 3B is a schematic illustrating some steps for implementing the fusion algorithm, according to some embodiments of the present disclosure.

FIG. 3B is a schematic illustrating some steps for implementing the fusion algorithm, according to some embodiments of the present disclosure.

Step 1, 301 of FIG. 3B, includes inputting the original PAN image 202 and the original MS image 201 into the fusion algorithm 304.

Step 2, 303 of FIG. 3B, explains that we use $x \in R^{hw \times N}$ to denote the measured low-resolution MS image with N spectral bands, where h and w is the height and width of each band, respectively. We denote the measured high-resolution PAN image as $Y \in R^{HW \times 1}$, where H and W are its height and width, respectively. The target, well-aligned and high-resolution, MS image of consistent sharpness with Y is denoted as $z \in R^{HW \times N}$.

Step 3, 305 to step 11, 321 of FIG. 3B, include that in order to reconstruct the target image Z, we solve the following regularized inverse problem:

$$\min_{Z,u} \frac{1}{2} \|X - DB(u)Z\|_F^2 + R_1(Z, Y) + R_2(u) \quad (1)$$

in which the first component is the data fidelity term, $u \in R^{n^2 \times 1}$ is the blur kernel, incorporating the misalignment and relative blur between Z and X prior to down sampling, $B(u) \in R^{HW \times HW}$ is the Toeplitz matrix implementing the convolution due to the blur kernel u, and $D \in R^{hw \times HW}$ is the down sampling operator. The second term $R_1$ characterizes the similarity relationship between Z and Y, which we use the local Laplacian prior (LLP) as a penalty term.

$$R_1(Z, Y) = \frac{\lambda}{2} \sum_{i,j} \sum_{k \in \omega_j} \left([L(Z_i)]_{j,k} - a_{i,j}[L(Y)]_{j,k} - c_{i,j}\right)^2 \quad (2)$$

where parameters are defined as follows: $\lambda$ is a scalar factor; $\omega_j$ is the $j^{th}$ square window of size $(2r+1)(2r+1)$ in an H×W image, with r an integer; k refers to the $k^{th}$ element within the window, k=1, 2, ..., $(2r+1)^2$; $a_{i,j}$ and $c_{i,j}$ are both constant coefficients of the linear affine transform in window $\omega_1$, corresponding to the $i^{th}$ band; $Z_i$ is the $i^{th}$ band of Z, $L(\cdot)$ is a function that computes the Laplacian of the input image, i.e., $L(Z)=Z \otimes S$, with $$S = \begin{bmatrix} 0 & -1 & 0 \\ -1 & 4 & -1 \\ 0 & -1 & 0 \end{bmatrix} \quad (3)$$

Step 3, 305 of FIG. 3B and Step 4, 309 of FIG. 3B, due to the non-convexity of our problem, the initialization of u plays a crucial role in avoiding bad local minima, especially when the misalignment is large. To overcome this problem, we propose to treat the stacked PAN as the ground-truth MS in the data fidelity term constrained by $N_0$ low-resolution MS bands whose spectra overlap with PAN, and initialize u by solving the optimization problem:

$$\min_{u,p} \sum_i^{N_0} \|DC(Y)u - X_i\|_F^2 + \alpha_1\|\nabla u - p\|_{2,1} + \alpha_2\|E(p)\|_{2,1} + I_S(u). \quad (4)$$

Step 5, 309 and step 6, 311 of FIG. 3B, the third term $R_2$ regularizes the blur kernel. The estimation quality of the blur kernel significantly affects the quality of the reconstructed high-resolution MS. We assume this kernel, constraining the target high-resolution MS and the measured low-resolution MS, is smooth, band-limited, and has compact spatial support with non-vanishing tail. We regularize the blur kernel using the Second-Order Total Generalized Variation (TGV2), given by $$R_2(u) = \min_p \alpha_1 \|\nabla u - p\|_{2,1} + \alpha_2 \|E(p)\|_{2,1} + I_S(u) \quad (5)$$

Where $\nabla u = [\nabla_h u \; \nabla_v u] \in R^{n^2 \times 2}$ are the gradients of u, $p=[p_1, p_2]$ is an auxiliary variable of the same size as $\nabla u$, $$E(p) = \left[\nabla_h p_1 \; \frac{\nabla_v p_1 + \nabla_h p_2}{2}; \; \frac{\nabla_v p_1 + \nabla_h p_2}{2} \; \nabla_h p_2\right] \quad (6)$$

$\|X\|_{2,1} = \sum_{i=1}^m \sqrt{\sum_{j=1}^m x_{i,j}^2}$, and $\alpha_1$, $\alpha_2$ are both scalars that control the regularization strength of p's approximation to $\nabla u$ and of the partial derivatives of p. $S = \{s \in R^{n^2 \times 1} | s_i \geq 0, \Sigma_i s_i = 1\}$ is a Simplex, and $I_s(\cdot)$ is its indicator function, which ensures that the computed blur kernel is non-negative and preserves the energy of the image, i.e., has sum equal to 1. We name our approach as Blind pan-sharpening with local Laplacian prior and Total generalized variation prior, or BLT in short.

Step 5, 309 of FIG. 3B, in order to solve the blur kernel, we introduce auxiliary parameters related to the second order total generalized variation as $x=\nabla u-p$, $y=\varepsilon(p)$, and $z=u$, and apply the classical augmented Lagrangian method by minimizing $$\Phi(Z, u, p, A, C, x, y, z, \Lambda_1, \Lambda_2, \Lambda_3) = \sum_{i=1}^N \left[\frac{1}{2}\|X_i - DB(z)Z_i\|_2^2 + \frac{\lambda}{2}\sum_j \sum_{k \in \omega_j} \left([L(Z_i)]_{j,k} - a_{i,j}[L(Y)]_{j,k} - c_{i,j}\right)^2\right] + \alpha_1\|x\|_{2,1} + \frac{\alpha_1\mu_1}{2}\|x - (\nabla u - p) - \Lambda_1\|_F^2 + \alpha_2\|y\|_{2,1} + \frac{\alpha_2\mu_2}{2}\|y - E(p) - \Lambda_2\|_F^2 + I_S(z) + \frac{\mu_3}{2}\|z - u - \Lambda_3\|_2^2 \quad (7)$$

with $\mu_1, \mu_2, \mu_3 > 0$. We solve the problem using the alternating direction method of multipliers (ADMM) by alternating between a succession of minimization steps and update steps.

The minimization subproblems of x and y are similar to each other and the solutions are given by component-wise soft-thresholding.

Step 5, 309 of FIG. 3B, the $1^{th}$ row of $x^{t+1}$ and $y^{t+1}$ are updated using $$x^{t+1}(l) = shrink_2\left(\nabla u(l) - p(l) + \Lambda_1(l), \frac{1}{\mu_1}\right) \quad (8)$$

$$y^{t+1}(l) = shrink_2\left(E(p)(l) + \Lambda_2(l), \frac{1}{\mu_2}\right), \text{where} \quad (9)$$

$$shrink_2(e, t) = \max(\|e\|_2 - t, 0)\frac{e}{\|e\|_2}.$$

Step 5, 309 of FIG. 3B, we use B(u)Z to denote the operator implementing the convolution between u and Z. Therefore, we can rewrite B(u)Z as B(u)Z=u⊗Z=Z⊗u=C (Z)u, where C is a Toeplitz matrix corresponding to the convolution operation. Using this notation, the z-subproblem first solves $$\min_z \sum_{i=1}^{N} \|DC(Z_i)z - X_i\|_2^2 + \frac{\mu_3}{2}\|z - u - \Lambda_3\|_2^2 \quad (10)$$

using conjugate gradient descent and then projects the solution onto the simplex S.

Step 6, 311 of FIG. 3B and Step 7, 313 of FIG. 3B, the blur kernel u is estimated finally by solving a {u, p}-subproblem, which minimizes $$\min_{u,p} \frac{\alpha_1\mu_1}{2}\|x - (\nabla u - p) - \Lambda_1\|_F^2 + \frac{\alpha_2\mu_2}{2}\|y - E(p) - \Lambda_2\|_F^2 \quad (11)$$

The problem can be solved efficiently by making use of the fast Fourier transform.

Step 8, 315 of FIG. 3B, the parameters of local Laplacian prior are determined by solving the {a, c}-subproblem can be approximated as $$\min_{a_{i,j}, c_{i,j}} \sum_j \sum_{k \in \omega_j} \left([L(Z_i)]_{j,k} - a_{i,j}[L(Y)]_{j,k} - c_{i,j}\right)^2 \quad (12)$$

similar to guided image filtering, $a_{i,j}$ and $c_{i,j}$ can be stably computed using $L(z_i)$'s local window as the input image and 's local window as the guide image.

Step 9, 317 of FIG. 3B, once the local Laplacian prior parameters are determined, $\hat{L}_i^z$ is the output of guided image filtering with input image $L(Z_i)$ and guide image L(Y), and L is Toeplitz matrix of the Laplacian.

The Z-subproblem in each individual channel is reformulated as $$\min_{Z_i} \frac{1}{2}\|DBZ_i - X_i\|_2^2 + \frac{\lambda}{2}\|LZ_i - \hat{L}_i^z\|_2^2 \quad (13)$$

Equation (12) has a closed-form solution:

$$Z_i = (B^T D^T DB + \lambda L^T L)^{-1}(B^T D^T X_i + \lambda \hat{L}_i^x) \quad (14)$$

Similarly, we use the Fast Fourier Transform to accelerate the computation since B is a Toeplitz matrix.

Step 10, 319 of FIG. 3B, for the next iteration, we update steps $$\begin{cases} \Lambda_1^{t+1} = \Lambda_1^t + \mu(\nabla u^{t+1} - p^{t+1} - x^{t+1}) \\ \Lambda_2^{t+1} = \Lambda_2^t + \mu(E(p^{t+1}) - y^{t+1}) \\ \Lambda_3^{t+1} = \Lambda_3^t + \mu(u^{t+1} - z^{t+1}) \end{cases} \quad (15)$$

until the relative error between the estimated fused image of the current iteration $$\frac{|Z^{t+1} - z^t|_F}{|Z^{t+1}|_F} < \epsilon,$$

wherein $\epsilon$ is a pre-defined threshold.

Step 11, 321 of FIG. 3B, finally, upon computing the relative error between the estimated fused image of the current iteration and a previous estimated fused image from a previous iteration, to a predetermined threshold E, the iterations are stopped, resulting in obtaining a PAN-sharpened image 323.

Figures 4A, 4D:
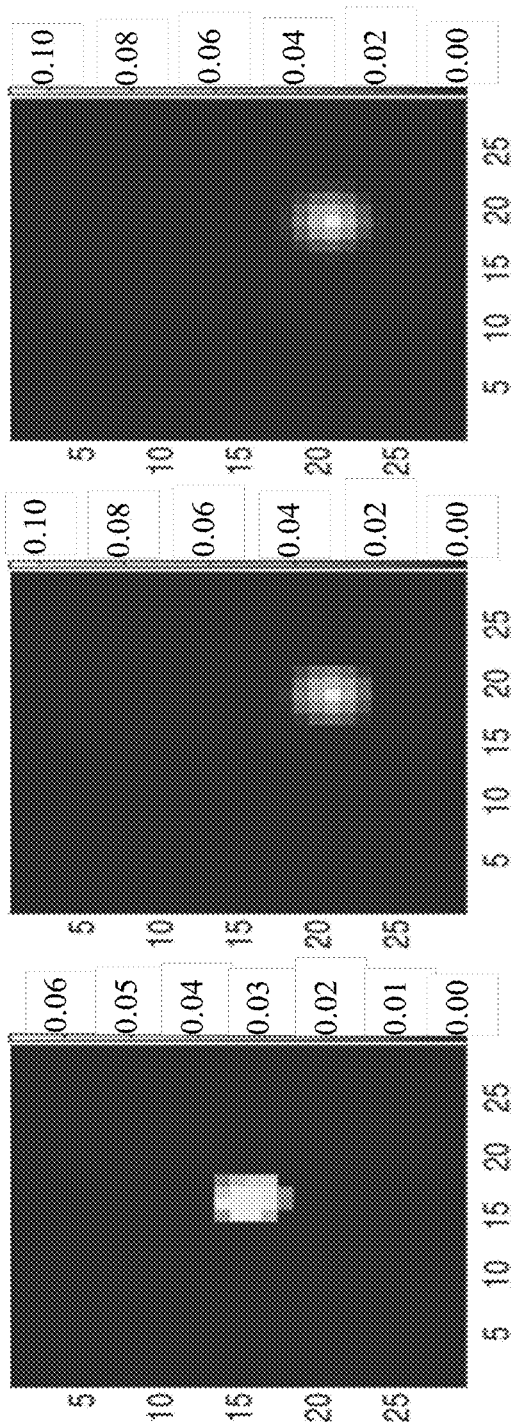

FIGS. 4A, 4B and 4C are pictures illustrating comparison of images using a prior art method and the method of the present disclosure as compared to a ground true image, such that FIG. 4A shows results using a prior art method, FIG. 4B shows results using the method of the present disclosure, and FIG. 4C shows a ground truth image, respectively, according to some embodiments of the present disclosure.

In comparison, BHMIFGLR failed to generate fused MS images with consistent performance; the blur estimated kernel estimated, shown in FIG. 4A, was trapped in a local minimum or saddle point which is far away from the ground-truth, shown in FIG. 4C, due to the large misalignment and the poor initial estimate of the blur kernel. Since the target MS image is aligned to the PAN, our approach treats the stacked PAN as the target MS, thereby generating a reasonable initialization of the blur kernel that aligns well to the ground-truth and resulting to a good estimation of the blur kernel, as shown in FIG. 4B.

FIG. 4D is a schematic of a table illustrating some experimental results of a quantitative analysis of blind pan-sharpening results, according to some embodiments of the present disclosure. Our results are consistent at small/large misalignments and outperform the baseline algorithms by nearly 6 dB.

Figure 5D:
FIGS. 5A, 5B, 5C, 5D are pictures illustrating example of images of pan-sharpening results from experiment I using different methods.
Figure 5C:
Figure 5B:
Figure 5A:
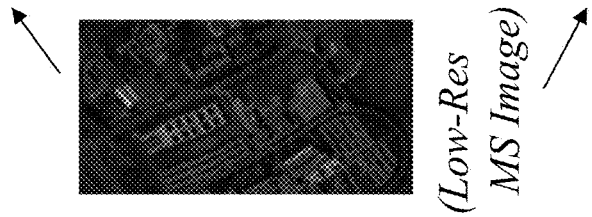

FIGS. 5A, 5B, 5C, 5D are pictures illustrating example of images of pan-sharpening results from experiment I using different methods, FIG. 5A is a input low-resolution MS image (only showing the RGB channels), FIG. 5B is a high-resolution PAN image, but misaligned with the low-resolution MS image, FIG. 5C is a fused image, and FIG. 5D is a simulated true High Resolution MS image, respectively, according to some embodiments of the present disclosure. Our fused image result shown in FIG. 5C is visually as sharp as the PAN image of FIG. 5B, and much sharper than the low-resolution MS image in FIG. 5A, while keeping the color information shown in FIG. 5A.

FIGS. 6A, 6B, 6C, 6D are pictures illustrating example of images of pan-sharpening results from experiment I using different methods, FIG. 6A is conventional prior art method using BHMIFGLR, FIG. 6B is conventional prior art method using HySure, FIG. 6C is a method of the present disclosure, and FIG. 6D is showing a Ground truth image, respectively, according to some embodiments of the present disclosure. We observe that BHMIFGLR is prone to generating spurious textures and ignoring details. For example, in FIG. 6A the reconstructed texture on the right of the parallel white lines, along the diagonal direction, is not present in the ground truth image. Also, the left of the three parallel white lines along the diagonal direction was not reconstructed. In comparison, HySure managed to fuse images with large misalignment, but failed to preserve the details of edges and textures. In FIG. 6B we observe that the three parallel white lines in the ground-truth image are blurred, and the details on the yellow roof are not identifiable. Instead, our approach, shown in FIG. 6C is visually much sharper and preserves more detail compared to the baseline methods.

Features

A system for reconstructing a super resolution image from multispectral (MS) images. The system having a transceiver to accept data. A memory to store the data, the data including MS images and a panchromatic (PAN) of a scene, each MS image is associated with the PAN image. A processing device operatively connected to the transceiver and the memory. The system comprising that the processing device is configured to initialize a fused image using the PAN image, and estimate a blur kernel between the PAN image and the MS images as an initialization function. Iteratively, fuse a MS image with an associated PAN image of the scene using a fusing algorithm by a processor. Each iteration includes: update the blur kernel based on a Second-Order Total Generalized Variation ($TGV^2$) function to regularize a kernel shape; fuse the PAN image and MS images with the updated blur kernel based on a local Laplacian prior (LLP) function to regularize the high-resolution similarity between the PAN image and the fused MS image to obtain an estimated fused image; compute a relative error between the estimated fused image of the current iteration and a previous estimated fused image from a previous iteration, wherein, when the relative error is less than a predetermined threshold, the iterations stop, resulting in obtaining a PAN-sharpened image. Output, via an output interface in communication with the processor, the PAN-sharpened image to a communication network or to a display device. Wherein, it is contemplated is that the system, can include any combination of the different aspects listed below, regarding the above system. In particular, the following aspects are intended to either individually or in combination, create one or more embodiments based on the one or more combination of aspects listed below, for the above recited system.

An aspect is that the PAN image used to initialize the fused image is a ridge PAN image. Another aspect is that the blur kernel is a rigid transformation blur kernel, and the initialization function is an initial blur kernel function.

Wherein an aspect can include that the LLP regularizes a relationship between high-frequency components of the MS images and PAN image, yielding a level of a fusion performance that is greater than a level of a fusion performance using local gradient constraints. Wherein an aspect is that the LLP is a second-order gradient, such that the LLP is generalized to a second gradient or a higher order gradient.

Another aspect includes the $TGV^2$ function is operable when an assumption that an image is piecewise constant is not valid in reconstructing images, such that the piecewise constant images are captured using the $TGV^2$ function during the image reconstruction. Wherein an aspect includes the TGV2 is a regularizer on the blur kernel, which is assumed to be smooth and centralized according to the TGV2.

Another aspect is that the MS images are obtained from a MS image sensor having a color filter array and positioned at a first optical axis and the PAN images are obtained from a PAN image sensor positioned at a second optical axis that converges at an angle with the first optical axis.

An aspect is that the MS images are low resolution images and are obtained from the MS image sensor optically coupled to a first imaging lens, and the PAN images are high resolution images and are obtained from the PAN image sensor, the MS image sensor and the PAN image sensor have substantially identical focal plane arrays of substantially identical photosensitive elements, and wherein the MS image sensor and the PAN image sensor are set in substantially a single geometric plane such that the focal plane arrays receive optical projections of substantially an identical version of the scene.

Another aspect is the MS images are captured at a first frame rate and the PAN images are captured at a second frame rate different than or the same as the first frame rate. Wherein an aspect can include the blur kernel combines a Point Spread Function (PSF) function and a shift such as a rigid transformation, together. It is possible another aspect is that the MS images are obtained from a MS image sensor having a color filter array and positioned at a first optical axis and the PAN images are obtained from a PAN image sensor positioned at a second optical axis that converges at an angle with the first optical axis.

An aspect is that the MS images are obtained from a MS image sensor having a color filter array and positioned at a first optical axis and the PAN images are obtained from a PAN image sensor positioned at a second optical axis that converges at an angle with the first optical axis. Further, contemplated is that an aspect is the data accepted by the input interface includes some data obtained from sensors including at least one MS image sensor device and at least one PAN image sensor device. Another aspect is that the PAN image used to initialize the fused image is a ridge PAN image. It is possible that an aspect is that the blur kernel is a rigid transformation blur kernel, and the initialization function is an initial blur kernel function.

Wherein, an aspect can further include instructions stored thereon which, when executed by a machine, are configured for the machine to perform operations to create a PAN image with about a same resolution as a resolution of a MS image by down-sampling PAN image data stored in the memory, or determining PAN image data from the MS image data, such that the received data, received via a transceiver device in communication with the non-transitory machine-readable medium and processing circuitry, includes some data obtained from sensors including at least one MS image sensor device and at least one PAN image sensor device. An aspect may be that the blur kernel jointly combines a Point Spread Function and a rigid transformation blur kernel.

DEFINITIONS

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided. Further, the definitions below cannot be viewed as prior art since the knowledge gained is from experimentation only.

Blind Deconvolution: Blind deconvolution is a deconvolution technique that permits recovery of the target scene from a single or set of "blurred" images in the presence of a poorly determined or unknown point spread function (PSF). (Note: In this patent, the unknown blur kernel is basically a rigid transformed PSF.) Regular linear and non-linear deconvolution techniques utilize a known PSF. For blind deconvolution, the PSF is estimated from the image or image set, allowing the deconvolution to be performed. Blind deconvolution can be performed iteratively, whereby each iteration improves the estimation of the PSF and the scene, or non-iteratively, where one application of the algorithm, based on exterior information, extracts the PSF. Iterative methods include maximum a posteriori estimation and expectation-maximization algorithms. A good estimate of the PSF is helpful for quicker convergence but not necessary.

Some challenges of Blind deconvolution can be that both input image and blur kernel must live in fixed subspace. That means input image, represented by w, has to be written as w=Bh, where B is random matrix of size L by K (K<L) and h is of size K×1, whereas blur kernel, if represented by x, has to be written as x=Cm, where C is random matrix of size L by N (N<L) and m is of size N×1. Observed image, if represented by y, given by y=w*x, can only be reconstructed if L>=K+N.

Point Spread Function (PSF): PSF describes the response of an imaging system to a point source or point object. A more general term for the PSF is a system's impulse response, the PSF being the impulse response of a focused optical system. The PSF in many contexts can be thought of as the extended blob in an image that represents a single point object. In functional terms it is the spatial domain version of the optical transfer function of the imaging system. It is a useful concept in Fourier optics, astronomical imaging, medical imaging, electron microscopy and other imaging techniques such as 3D microscopy (like in confocal laser scanning microscopy) and fluorescence microscopy. The degree of spreading (blurring) of the point object is a measure for the quality of an imaging system. In non-coherent imaging systems such as fluorescent microscopes, telescopes or optical microscopes, the image formation process is linear in the image intensity and described by linear system theory. This means that when two objects A and B are imaged simultaneously, the resulting image is equal to the sum of the independently imaged objects. In other words: the imaging of A is unaffected by the imaging of B and vice versa, owing to the non-interacting property of photons. In space-invariant system, i.e. the PSF is the same everywhere in the imaging space, the image of a complex object is then the convolution of the true object and the PSF. However, when the detected light is coherent, image formation is linear in the complex field. The recorded intensity image then can show cancellations or other non-linear effects.

Deep Image Prior: Deep image prior is a type of convolutional neural network used to enhance a given image with no prior training data other than the image itself. A neural-network is randomly initialized and used as prior to solve inverse problems such as noise reduction, super-resolution, and inpainting. Image statistics is captured by the structure of a convolutional image generator rather than by any previously learned capabilities.

Resolution tradeoffs using some Sensors: Some aspects learned from experimentation includes that all sensors can have a fixed signal-to-noise ratio that can be a function of the hardware design. The energy reflected by the target needs to have a signal level large enough for the target to be detected by the sensor. The signal level of the reflected energy increases if the signal is collected over a larger instantaneous field of view (IFOV) or if it is collected over a broader spectral bandwidth. Collecting energy over a larger IFOV reduces the spatial resolution while collecting it over a larger bandwidth reduces its spectral resolution. Thus, there is a tradeoff between the spatial and spectral resolutions of the sensor. As noted above, a high spatial resolution can accurately discern small or narrow features like roads, automobiles, etc. A high spectral resolution allows the detection of minor spectral changes, like those due to vegetation stress or molecular absorption. It seemed that most optical remote sensing satellites carry two types of sensors—the panchromatic and the multispectral sensors. The multispectral sensor records signals in narrow bands over a wide IFOV while the panchromatic sensor records signals over a narrower IFOV and over a broad range of the spectrum. Thus, the multispectral (MS) bands have a higher spectral resolution, but a lower spatial resolution compared to the associated panchromatic (PAN) band, which has a higher spatial resolution and a lower spectral resolution.

Alternating Direction Method of Multipliers (ADMM): ADMM is a variant of the augmented Lagrangian scheme that uses partial updates for the dual variables. This method is often applied to solve problems such as $$\min_x f(x) + g(x).$$

This is equivalent to a constrained problem $$\min_{x,y} f(x) + g(y)$$

subjet to x=y. Though this change may seem trivial, the problem can now be attacked using methods of constrained optimization (in particular, the augmented Lagrangian method), and the objective function is separable in x and y. The dual update requires solving a proximity function in x and y at the same time; the ADMM technique allows this problem to be solved approximately by first solving for x with y fixed, and then solving for y with x fixed. Rather than iterate until convergence (like the Jacobi method), the algorithm proceeds directly to updating the dual variable and then repeating the process. This is not equivalent to the exact minimization, but surprisingly, it can still be shown that this method converges to the right answer (under some assumptions). Because of this approximation, the algorithm is distinct from the pure augmented Lagrangian method.

Total Variation (TV) and Total Generalized Variation (TGV): TV based strategies, can include regularization for parallel imaging, such as in iterative reconstruction of undersampled image data sets. TV models can have a benefit that they are well suited to remove random noise, while preserving edges in the image. However, an assumption of TV is that the images consist of regions, which are piecewise constant. What was learned is that the use of TV can often lead to staircasing artifacts and result in patchy, sketch type images which appear unnatural. However, using TGV which may be equivalent to TV in terms of edge preservation and noise removal, TGV can also be applied in imaging situations where an assumption that the image is piecewise constant is not valid. As a result, an application of TGV in imaging can be less restrictive. For example, TGV can be applied for image denoising and during iterative image reconstruction of under-sampled image data sets, was found to possibly yielding results that are superior to conventional TV. Where TGV may be capable to measure, in some sense, image characteristics up to a certain order of differentiation. At least one aspect noted is that TV only takes the first derivative into account. TGV is a semi-norm of a Banach space, associated variational problems that fit well into a well-developed mathematical theory of convex optimization problems, especially with respect to analysis and computational realization. Moreover, each function of bounded variation admits a finite TGV value, making the notion suitable for images. Which means that piecewise constant images can be captured with the TGV model which even extends the TV model. Finally, TGV is translation invariant as well as rotationally invariant, meaning that it is in conformance with the requirement that images are measured independent from the actual viewpoint. However, it was learned that using $TGV^2$ as a regularizer can lead to an absence of the staircasing effect which is often observed in TV regularization.

Piecewise Constant Function: A function is said to be piecewise constant if it is locally constant in connected regions separated by a possibly infinite number of lower-dimensional boundaries. The Heaviside step function, rectangle function, and square wave are examples of one-dimensional piecewise constant functions. In mathematics, a piecewise-defined function (also called a piecewise function, a hybrid function, or definition by cases) is a function defined by multiple sub-functions, each sub-function applying to a certain interval of the main function's domain, a sub-domain. Piecewise is actually a way of expressing the function, rather than a characteristic of the function itself, but with additional qualification, it can describe the nature of the function. For example, a piecewise polynomial function is a function that is a polynomial on each of its sub-domains, but possibly a different one on each. The word piecewise is also used to describe any property of a piecewise-defined function that holds for each piece but not necessarily hold for the whole domain of the function. A function is piecewise differentiable or piecewise continuously differentiable if each piece is differentiable throughout its subdomain, even though the whole function may not be differentiable at the points between the pieces. In convex analysis, the notion of a derivative may be replaced by that of the subderivative for piecewise functions. Although the "pieces" in a piecewise definition need not be intervals, a function is not called "piecewise linear" or "piecewise continuous" or "piecewise differentiable" unless the pieces are intervals.

Actual viewpoint: A viewpoint refers to the position we take the photograph from. This will also be the position you place the viewer in when they are looking at your finished shot. The viewpoint can dramatically change the feel of the photograph. A transformation of particular interest is viewpoint (i.e., camera panning, zooming, and translation). Cast as an image transformation, a change in camera viewpoint can be modeled as a mapping, or warp, between pixels in one or more basis views and pixels in a new image, representing a synthetic view of the same scene. Learned from experimentation is that there are some factors to consider in addressing an actual viewpoint, such as: measurability: Sufficient information to compute the transformation must be automatically or semi-automatically extracted from the basis images; correctness: Each synthesized image should be physically correct, i.e., it should correspond to what the real scene would look like as a result of the specified scene transformation; and synthesis: New algorithms must be developed for image-based scene transformations. The techniques should be robust, easy to use, and general enough to handle complex real-world objects and scenes.

An image moment is a certain particular weighted average (moment) of the image pixels' intensities, or a function of such moments, usually chosen to have some attractive property or interpretation.

Moments invariant: Moments are well-known for their application in image analysis, since they can be used to derive invariants with respect to specific transformation classes. The term invariant moments is often abused in this context. However, while moment invariants are invariants that are formed from moments, the only moments that are invariants themselves are the central moments. Note that the invariants detailed are exactly invariant only in the continuous domain. In a discrete domain, neither scaling nor rotation are well defined: a discrete image transformed in such a way is generally an approximation, and the transformation is not reversible. These invariants therefore are only approximately invariant when describing a shape in a discrete image. Translation invariants: The central moments $\mu_{i,j}$ of any order are, by construction, invariant with respect to translations, i.e. in Euclidean geometry, a translation is a geometric transformation that moves every point of a figure or a space by the same distance in a given direction.

Figure 7:
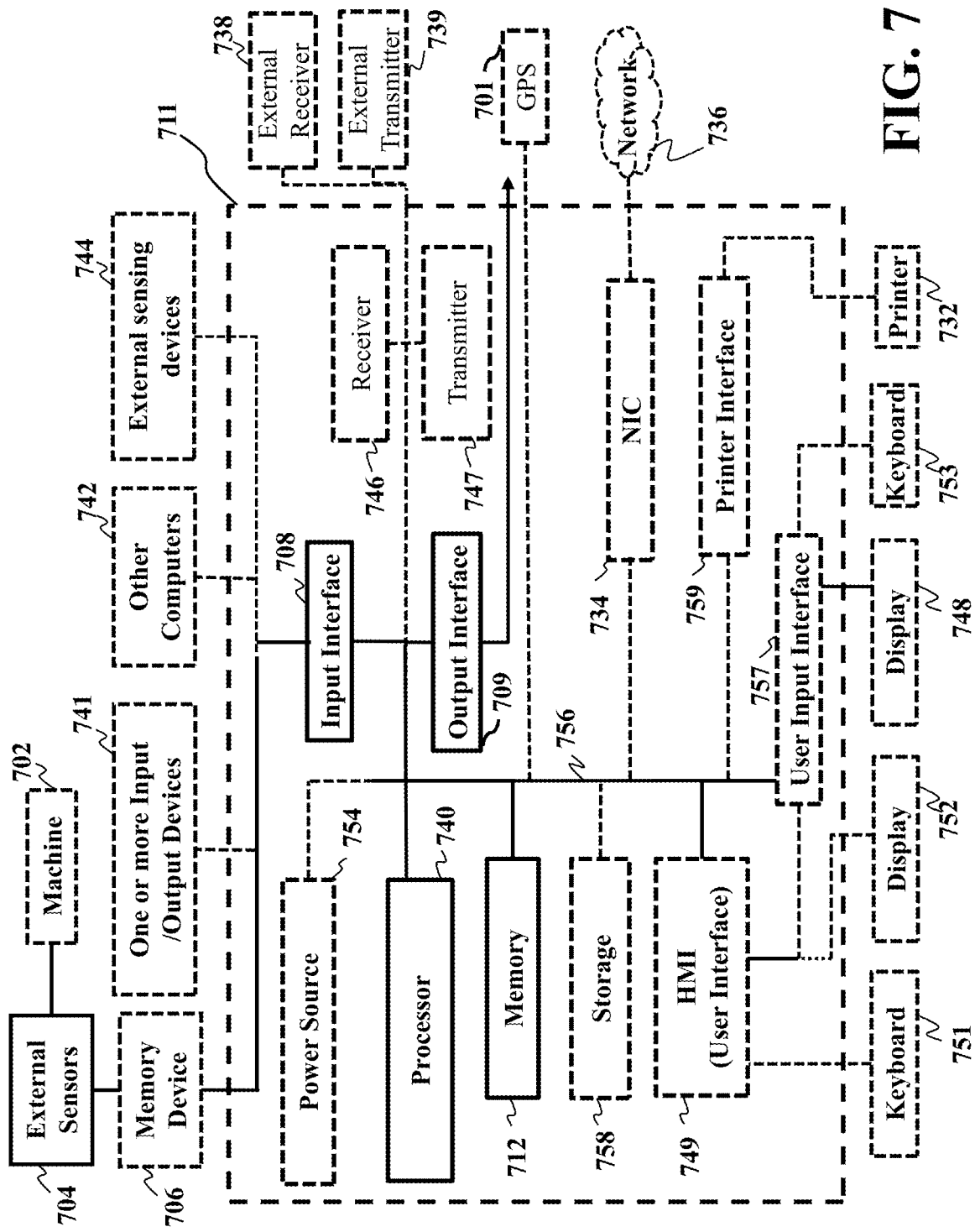
FIG. 7 is a block diagram of illustrating the method of FIG. 1A, that can be implemented using an alternate computer or processor, according to some embodiments of the present disclosure.

FIG. 7 is a block diagram of illustrating the method of FIG. 1A, that can be implemented using an alternate computer or processor, according to embodiments of the present disclosure. The computer 711 includes a processor 740, computer readable memory 712, storage 758 and user interface 749 with display 752 and keyboard 751, which are connected through bus 756. For example, the user interface 764 in communication with the processor 740 and the computer readable memory 712, acquires and stores the image data in the computer readable memory 712 upon receiving an input from a surface, keyboard 753, of the user interface 757 by a user.

The computer 711 can include a power source 754, depending upon the application the power source 754 may be optionally located outside of the computer 711. Linked through bus 756 can be a user input interface 757 adapted to connect to a display device 648, wherein the display device 748 can include a computer monitor, camera, television, projector, or mobile device, among others. A printer interface 759 can also be connected through bus 756 and adapted to connect to a printing device 732, wherein the printing device 732 can include a liquid inkjet printer, solid ink printer, large-scale commercial printer, thermal printer, UV printer, or dye-sublimation printer, among others. A network interface controller (NIC) 734 is adapted to connect through the bus 756 to a network 736, wherein image data or other data, among other things, can be rendered on a third-party display device, third party imaging device, and/or third-party printing device outside of the computer 711. The computer/processor 711 can include a GPS 701 connected to bus 756. Further, Still referring to FIG. 7, the image data or other data, among other things, can be transmitted over a communication channel of the network 736, and/or stored within the storage system 758 for storage and/or further processing. Further, the time series data or other data may be received wirelessly or hard wired from a receiver 746 (or external receiver 738) or transmitted via a transmitter 747 (or external transmitter 739) wirelessly or hard wired, the receiver 746 and transmitter 747 are both connected through the bus 756. The computer 711 may be connected via an input interface 708 to external sensing devices 744 and external input/output devices 741. The input interface 708 can be connected to one or more input/output devices 741, external memory 706, external sensors 704 which may be connected to a machine-like device 702. For example, the external sensing devices 744 may include sensors gathering data before-during-after of the collected time-series data of the machine. The computer 711 may be connected to other external computers 742. An output interface 709 may be used to output the processed data from the processor 740. It is noted that a user interface 749 in communication with the processor 740 and the non-transitory computer readable storage medium 712, acquires and stores the region data in the non-transitory computer readable storage medium 712 upon receiving an input from a surface 752 of the user interface 749 by a user.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for reconstructing a super resolution image from multispectral (MS) images, having a transceiver to accept data, a memory to store the data, wherein the data including MS images and a panchromatic (PAN) of a scene, each MS image is associated with the PAN image, as well as a processing device operatively connected to the transceiver and the memory, the system comprising that the processing device is configured to:

initialize a fused image using the PAN image, and estimate a blur kernel between the PAN image and the MS images as an initialization function;

iteratively, fuse a MS image with an associated PAN image of the scene using a fusing algorithm by a processor, each iteration includes:

update the blur kernel based on a Second-Order Total Generalized Variation ($TGV^2$) function to regularize a kernel shape;

fuse the PAN image and MS images with the updated blur kernel based on a local Laplacian prior (LLP) function to regularize the high-resolution similarity between the PAN image and the fused MS image to obtain an estimated fused image;

compute a relative error between the estimated fused image of the current iteration and a previous estimated fused image from a previous iteration, wherein, when the relative error is less than a predetermined threshold, the iterations stop, resulting in obtaining a PAN-sharpened image; and output, via an output interface in communication with the processor, the PAN-sharpened image to a communication network or to a display device.

2. The system of claim 1, wherein the PAN image used to initialize the fused image is a ridge PAN image.

3. The system of claim 1, wherein the blur kernel is a rigid transformation blur kernel, and the initialization function is an initial blur kernel function.

4. The system of claim 1, wherein the LLP regularizes a relationship between high-frequency components of the MS images and PAN image, yielding a level of a fusion performance that is greater than a level of a fusion performance using local gradient constraints.

5. The system of claim 4, wherein the LLP is a second-order gradient, such that the LLP is generalized to a second gradient or a higher order gradient.

6. The system of claim 1, wherein the $TGV^2$ function is operable when an assumption that an image is piecewise constant is not valid in reconstructing images, such that the piecewise constant images are captured using the $TGV^2$ function during the image reconstruction.

7. The system of claim 6, wherein the TGV2 is a regularizer on the blur kernel, which is assumed to be smooth and centralized according to the TGV2.

8. The system of claim 1, wherein the MS images are obtained from a MS image sensor having a color filter array and positioned at a first optical axis and the PAN images are obtained from a PAN image sensor positioned at a second optical axis that converges at an angle with the first optical axis.

9. An apparatus having computer storage including a computer-readable storage medium, and a hardware processor device operatively coupled to the computer storage and to reconstruct spatial resolution of an image of a scene captured within multi-spectral (MS) images and panchromatic (PAN) images, the MS images obtained from a MS image sensor having a color filter array and positioned at a first optical axis, and the PAN images obtained from a PAN image sensor positioned at a second optical axis that is substantially parallel to the first optical axis, wherein, to reconstruct the spatial resolution of the image, the apparatus comprising that the hardware processor device is to:
   initialize a fused image using a PAN image, and estimate a blur kernel between the PAN image and the MS images using an initialization function;
   iteratively, fuse a MS image with an associated PAN image of the scene using a fusing algorithm by a processor, each iteration includes:
   update the blur kernel based on a Second-Order Total Generalized Variation ($TGV^2$) function to regularize a kernel shape;
   fuse the PAN image and MS images with the updated blur kernel based on a local Laplacian prior (LLP) function to regularize the high-resolution similarity between the PAN and the fused MS image to obtain an estimated fused image;
   compute a relative error between the estimated fused image of the current iteration and a previous estimated fused image from a previous iteration, wherein, when the relative error is less than a predetermined threshold, the iterations stop, resulting in obtaining a PAN-sharpened image; and
   output, via an output interface in communication with the processor, the PAN-sharpened image to a communication network or to a display device.

10. The apparatus of claim 9, wherein the MS images are low resolution images and are obtained from the MS image sensor optically coupled to a first imaging lens, and the PAN images are high resolution images and are obtained from the PAN image sensor, the MS image sensor and the PAN image sensor have substantially identical focal plane arrays of substantially identical photosensitive elements, and wherein the MS image sensor and the PAN image sensor are set in substantially a single geometric plane such that the focal plane arrays receive optical projections of substantially an identical version of the scene.

11. The apparatus of claim 9, wherein the MS images are captured at a first frame rate and the PAN images are captured at a second frame rate different than or the same as the first frame rate.

12. The apparatus of claim 9, wherein the blur kernel combines a Point Spread Function (PSF) function and a shift such as a rigid transformation, together.

13. The system of claim 9, wherein the MS images are obtained from a MS image sensor having a color filter array and positioned at a first optical axis and the PAN images are obtained from a PAN image sensor positioned at a second optical axis that converges at an angle with the first optical axis.

14. A system for reconstructing a super resolution image from multispectral (MS) images, and an input interface to accept data, along with a memory to store the data, the data including MS images and panchromatic (PAN) images of a scene, each MS image is associated with a PAN image, such that a hardware processing device is operatively connected to the input interface and the memory, the system comprising that the hardware processing device is configured to:
   initialize a fused image using a rigid PAN image;
   estimate a rigid transformation blur kernel between the PAN image and the MS images as an initial blur kernel function;
   iteratively, fuse a MS image with an associated PAN image of the scene using a fusing algorithm by a processor, each iteration includes:
   update the blur kernel based on a Second-Order Total Generalized Variation ($TGV^2$) function to regularize a kernel shape;
   fuse the PAN image and MS images with the updated blur kernel based on a local Laplacian prior (LLP) function to regularize the high-resolution similarity between the PAN image and the fused MS image to obtain an estimated fused image;
   compute a relative error between the estimated fused image of the current iteration and a previous estimated fused image from a previous iteration, wherein, when the relative error is less than a predetermined threshold, the iterations stop, resulting in obtaining a PAN-sharpened image; and
   output, via an output interface in communication with the processor, the PAN-sharpened image to a communication network or to a display device.

15. The system of claim 14, wherein the MS images are obtained from a MS image sensor having a color filter array and positioned at a first optical axis and the PAN images are obtained from a PAN image sensor positioned at a second optical axis that converges at an angle with the first optical axis.

16. The system of claim 14, wherein the data accepted by the input interface includes some data obtained from sensors including at least one MS image sensor device and at least one PAN image sensor device.

17. The system of claim 14, wherein the PAN image used to initialize the fused image is a ridge PAN image.

18. The system of claim 14, wherein the blur kernel is a rigid transformation blur kernel, and the initialization function is an initial blur kernel function.

19. A non-transitory machine-readable medium including instructions stored thereon which, when executed by processing circuitry, configure the processing circuitry to perform operations to sharpen a multi-spectral (MS) image using data from a panchromatic (PAN) image, the operations for:

receiving data, the data including MS images and a panchromatic (PAN) image of a scene, each MS image is associated with the PAN image;

initializing a fused image using the PAN image, and estimate a blur kernel between the PAN image and the MS images to obtain a blur kernel using an initialization function;

iteratively, fuse a MS image with an associated PAN image of the scene using a fusing algorithm by a processor, each iteration includes:

updating the blur kernel based on a Second-Order Total Generalized Variation ($TGV^2$) function to regularize a kernel shape;

fusing the PAN image and MS images with the updated blur kernel based on a local Laplacian prior (LLP) function to regularize the high-resolution similarity between the PAN image and the fused MS image to obtain an estimated fused image;

computing a relative error between the estimated fused image of the current iteration and a previous estimated fused image from a previous iteration, wherein, when the relative error is less than a predetermined threshold, the iterations stop, resulting in obtaining a PAN-sharpened image; and outputting the PAN-sharpened image to a communication network or to a display device via an output interface in communication with the processor.

20. The non-transitory machine-readable medium of claim 19, further including instructions stored thereon which, when executed by a machine, are configured for the machine to perform operations to create a PAN image with about a same resolution as a resolution of a MS image by down-sampling PAN image data stored in the memory, or determining PAN image data from the MS image data, such that the received data, received via a transceiver device in communication with the non-transitory machine-readable medium and processing circuitry, includes some data obtained from sensors including at least one MS image sensor device and at least one PAN image sensor device.

* * * * *